US011759839B2

(12) United States Patent
Dole

(10) Patent No.: US 11,759,839 B2
(45) Date of Patent: Sep. 19, 2023

(54) PIPE GROOVING DEVICE

(71) Applicant: Victaulic Company, Easton, PA (US)

(72) Inventor: Douglas R. Dole, Whitehouse Station, NJ (US)

(73) Assignee: VICTAULIC COMPANY, Easton, PA (US)

( * ) Notice: Subject to any disclaimer, the term of this patent is extended or adjusted under 35 U.S.C. 154(b) by 283 days.

(21) Appl. No.: 17/030,418

(22) Filed: Sep. 24, 2020

(65) Prior Publication Data

US 2022/0088662 A1 Mar. 24, 2022

(51) Int. Cl.
*B21D 17/04* (2006.01)
*F16H 53/02* (2006.01)
*B23Q 5/34* (2006.01)
*B21D 15/00* (2006.01)

(52) U.S. Cl.
CPC ............. *B21D 17/04* (2013.01); *B21D 15/00* (2013.01); *B23Q 5/344* (2013.01); *B23Q 5/345* (2013.01); *F16H 53/02* (2013.01)

(58) Field of Classification Search
CPC ........... B21D 17/04; B23G 1/22; F16H 53/02; B23Q 5/344; B23Q 5/345
USPC .............................. 72/107, 370.21; 279/156
See application file for complete search history.

(56) References Cited

U.S. PATENT DOCUMENTS

| 705,518 | A | * | 7/1902 | Einfeldt |
| 1,414,668 | A | | 5/1922 | Reed |
| 2,004,816 | A | | 6/1935 | Lindgren |
| 2,089,475 | A | | 8/1937 | Grotnes |
| 2,179,849 | A | | 11/1939 | Freeze |
| 2,679,089 | A | | 5/1954 | Opitz et al. |
| 2,684,101 | A | | 7/1954 | Clerke |
| 2,686,442 | A | | 8/1954 | Wilson |
| 2,809,687 | A | | 10/1957 | Ogle |

(Continued)

FOREIGN PATENT DOCUMENTS

| CN | 201249229 Y | 6/2009 |
| CN | 201320572 Y | 10/2009 |

(Continued)

OTHER PUBLICATIONS

Author Unknown; SP-The Best Pipe in the World, Company Website, Products, Press Fittings; obtained online at http://www.superpipe.co.za/SP_PressFittings.htm on Jan. 29, 2020; pp. 1-2.

(Continued)

*Primary Examiner* — Jimmy T Nguyen
*Assistant Examiner* — Smith Oberto Bapthelus
(74) *Attorney, Agent, or Firm* — Ballard Spahr LLP

(57) ABSTRACT

A pipe grooving device having a plurality of geared cams uses synchronizing gears, each of which meshes with two of the geared cams, to synchronize the rotation of the cams which engage the pipe element to form the groove. The position of the groove relative to the end of the pipe is controlled by a stop body which incorporates a plate mounted ring which engages and disengages with a pipe stop surface on one or more of the cams to limit or permit cam rotation. The pipe stop body is positioned within a cup which receives the pipe element. The cup limits pipe end flare and limits the tendency of the pipe to go out of round during the grooving process. The device mounts on a powered chuck which turns the pipe element.

34 Claims, 10 Drawing Sheets

(56) References Cited

U.S. PATENT DOCUMENTS

| | | | |
|---|---|---|---|
| 2,821,099 A | 1/1958 | Beecher |
| 2,942,567 A | 6/1960 | Kargard et al. |
| 3,260,089 A | 7/1966 | Hazelton et al. |
| 3,260,090 A | 7/1966 | Sofranko |
| 3,277,684 A | 10/1966 | Gareri |
| 3,299,680 A | 1/1967 | Thompson |
| 3,383,892 A | 5/1968 | Brothen |
| 3,387,477 A | 6/1968 | Shupper |
| 3,473,359 A | 10/1969 | Joslin |
| 3,564,887 A | 2/1971 | Novak et al. |
| 3,595,049 A | 7/1971 | Holt |
| 3,602,025 A | 8/1971 | Awano et al. |
| 3,686,917 A | 8/1972 | Hikida et al. |
| 3,717,017 A | 2/1973 | Vukovich |
| 3,827,269 A | 8/1974 | Hoagland et al. |
| 3,831,416 A | 8/1974 | Wolfe |
| 3,869,895 A | 3/1975 | Holub |
| 4,018,462 A | 4/1977 | Saka |
| 4,043,161 A * | 8/1977 | Toma ................ B21D 15/06 |
| | | 72/78 |
| 4,142,393 A | 3/1979 | Nagel |
| 4,143,535 A | 3/1979 | Bouman |
| 4,173,877 A | 11/1979 | Kreiskorte |
| 4,372,026 A | 2/1983 | Mosing |
| 4,389,875 A | 6/1983 | Grotnes, II |
| 4,660,803 A | 4/1987 | Johnston et al. |
| 4,838,066 A | 6/1989 | Marcon et al. |
| 5,002,318 A | 3/1991 | Witter |
| 5,040,729 A | 8/1991 | Carrozza |
| 5,245,848 A | 9/1993 | Lee, Jr. et al. |
| 5,291,769 A | 3/1994 | Miyano |
| 5,435,213 A | 7/1995 | Buck |
| 5,479,961 A | 1/1996 | DeMarsh et al. |
| 5,528,919 A | 6/1996 | McGrady et al. |
| 5,778,715 A | 7/1998 | Lippka |
| 5,911,939 A | 6/1999 | Jenkins |
| 5,950,472 A | 9/1999 | Grotnes |
| 6,145,892 A | 11/2000 | Weber |
| 6,257,627 B1 | 7/2001 | Fujiwara et al. |
| 6,272,895 B1 | 8/2001 | Hamm |
| 6,338,263 B1 | 1/2002 | Obata et al. |
| 6,547,785 B1 | 4/2003 | Katayama et al. |
| 6,776,018 B2 | 8/2004 | Hamm et al. |
| 6,968,719 B2 | 11/2005 | Zifferer |
| 6,976,712 B2 | 12/2005 | Lukach |
| 7,997,112 B2 | 8/2011 | Sandman et al. |
| 9,003,851 B2 | 4/2015 | Obata et al. |
| 10,525,516 B2 | 1/2020 | Dole |
| 10,525,517 B2 | 1/2020 | Dole |
| 10,960,450 B2 | 3/2021 | Dole |
| 11,173,533 B2 | 11/2021 | Dole |
| 11,383,285 B2 | 7/2022 | Dole |
| 11,441,662 B2 | 9/2022 | Dole |
| 11,441,663 B2 | 9/2022 | Dole |
| 11,446,725 B2 | 9/2022 | Dole |
| 11,499,618 B2 | 11/2022 | Dole |
| 11,549,574 B2 | 1/2023 | Dole |
| 2002/0007514 A1 | 1/2002 | Dole et al. |
| 2002/0129684 A1 | 9/2002 | Oswald |
| 2003/0192357 A1 | 10/2003 | Hamm et al. |
| 2003/0226387 A1 | 12/2003 | Dole et al. |
| 2004/0221635 A1 | 11/2004 | Bauder |
| 2005/0178179 A1 | 8/2005 | Dole |
| 2006/0011017 A1 | 1/2006 | Kathan |
| 2008/0012326 A1 | 1/2008 | Braathen et al. |
| 2009/0293575 A1 * | 12/2009 | Mishima ............ B21D 41/045 |
| | | 72/370.12 |
| 2011/0232434 A1 | 9/2011 | Bortoli |
| 2011/0271797 A1 | 11/2011 | Light et al. |
| 2016/0236256 A1 | 8/2016 | Price et al. |
| 2017/0151596 A1 | 6/2017 | Dole |
| 2018/0318694 A1 | 11/2018 | Paglierani et al. |
| 2018/0318894 A1 * | 11/2018 | Dole ..................... F16H 53/00 |
| 2019/0184441 A1 | 6/2019 | Dole |
| 2020/0016644 A1 | 1/2020 | Dole |
| 2020/0070231 A1 | 3/2020 | Dole |
| 2020/0070232 A1 | 3/2020 | Dole |
| 2020/0070233 A1 | 3/2020 | Dole |
| 2021/0053102 A1 | 2/2021 | Dole |
| 2021/0170468 A1 | 6/2021 | Dole |
| 2022/0088662 A1 | 3/2022 | Dole |
| 2022/0395882 A1 | 12/2022 | Dole |

FOREIGN PATENT DOCUMENTS

| | | |
|---|---|---|
| CN | 101856706 A | 10/2010 |
| CN | 202100679 U | 1/2012 |
| CN | 102699168 A | 10/2012 |
| CN | 202834505 U | 3/2013 |
| CN | 204523912 U | 8/2015 |
| DE | 2441387 | 3/1976 |
| DE | 102006062208 | 6/2008 |
| EP | 1038603 | 9/2000 |
| GB | 1317148 | 5/1973 |
| JP | S63126623 | 5/1988 |
| JP | H11207411 A | 8/1999 |
| RU | 2071852 C1 | 1/1997 |
| RU | 2147957 C1 | 4/2000 |
| RU | 2784021 C1 | 1/2022 |
| SU | 628973 A1 | 10/1978 |
| SU | 1687330 A1 | 10/1991 |
| TW | 291451 B | 11/1996 |

OTHER PUBLICATIONS

Dole, Douglas R.; U.S. Appl. No. 16/998,385; Pipe Grooving Device Having Flared Cup; filed Aug. 20, 2020; 61 pages.

* cited by examiner

PIPE GROOVING DEVICE

FIELD OF THE INVENTION

This invention concerns devices for cold working pipe elements.

BACKGROUND

Cold working of pipe elements, for example, impressing a circumferential groove in a pipe element to accept a mechanical pipe coupling, is advantageously accomplished using roll grooving machines having an inner roller which engages an inside surface of the pipe element and an outer roller which simultaneously engages an outside surface of the pipe element opposite to the inner roller. As the pipe is rotated about its longitudinal axis, often by driving the inner roller, the outer roller is progressively forced toward the inner roller. The rollers have surface profiles which are impressed onto the pipe element circumference as it rotates, thereby forming a circumferential groove.

There are various challenges which this technique faces if it is to cold work pipe elements with the required tolerances to the necessary precision. Most pressing are the difficulties associated with producing a groove of the desired radius (measured from the center of the pipe element bore to the floor of the groove) within a desired tolerance range at a desired distance from the end of the pipe element. These considerations have resulted in complicated prior art devices which, for example, require actuators for forcing the rollers into engagement with the pipe element and the ability for the operator to adjust the roller travel to achieve the desired groove radius. Additionally, prior art roll grooving machines have low production rates, often requiring many revolutions of the pipe element to achieve a finished circumferential groove. There is clearly a need for devices, for example, those using cams, to cold work pipe elements which are simple yet produce results more quickly with less operator involvement.

SUMMARY

The invention concerns a device for cold working a pipe element. In an example embodiment the device comprises a housing. A plurality of cam gears are mounted within the housing. Each one of the cam gears is rotatable about a respective one of a plurality of first axes of rotation. The first axes of rotation are parallel to one another. The cam gears are positioned about a central space for receiving the pipe element. A plurality of cam bodies are mounted such that each one is on a respective one of the cam gears. A plurality of cam surfaces are mounted such that, each one of the cam surfaces extending around a respective one of the cam bodies and is engageable with the pipe element received within the central space. In this example each one of the cam surfaces comprises a region of increasing radius and a discontinuity of the cam surface. Each one of the radii is measured from a respective one of the first axes of rotation.

A traction surface extends around at least one of the cam bodies. The traction surface comprises a plurality of projections extending outwardly from the at least one cam body in this example. The traction surface has a gap therein. The gap is aligned axially with the discontinuity of the one cam surface surrounding the at least one cam body. An engagement assembly is positioned within the central space. The pipe element contacts the engagement assembly upon insertion of the pipe element into the central space. A plurality of synchronization gears are mounted within the housing. Each one of the synchronization gears is rotatable about a respective one of a plurality of second axes of rotation. The second axes of rotation are parallel to the first axes of rotation. Each one of the synchronization gears meshes with two of the cam gears in this example. By way of example each radius of each cam surface is measured from the respective first axis of rotation of a respective the cam gear. In an example embodiment the number of synchronization gears is one less than the number of cam gears. An example embodiment may comprise at most five of the cam gears. Further by way of example, a device according to the invention may comprise at most four of the synchronization gears.

In an example embodiment, the engagement assembly comprises a cup. The cup surrounds a central axis and defines an opening for receiving the pipe element upon insertion of the pipe element into the central space. Further by way of example the cup comprises an inner surface having a first diameter at the opening and a second diameter distal to the opening. The first diameter is greater than the second diameter in this example. In a specific example the inner surface is conical. An example device according to invention may further comprise a pipe stop body positioned within the cup. The pipe stop body is movable along the central axis relatively to the cup. The cup is movable along the central axis relatively to the cam bodies in this example.

An example device may further comprise a ring mounted on the pipe stop body concentric with the central axis. A first cam stop surface projects from one of the cam bodies. The pipe stop body is movable relatively to the cam bodies between a first position, wherein the ring is engageable with the first cam stop surface thereby limiting rotation of the cam bodies, and a second position, wherein the ring is not engageable with the first cam stop surface, thereby permitting rotation of the cam bodies. In an example embodiment the first cam stop surface is positioned adjacent to the discontinuity of the cam surface on the one cam body. An example device may further comprise a rib projecting from the one cam body. The rib is positioned adjacent to the cam surface on the one cam body and extends around a portion of the one cam body. The first cam stop surface is positioned on a first end of the rib in this example.

An example device may further comprise a second cam stop surface positioned on a second end of the rib. The second cam stop surface projects from the one cam body. The second cam stop surface is positioned in spaced relation to the first cam stop surface. In an example embodiment at least one of the first and second cam stop surfaces has a concave curvature. Further by way of example, a stop spring may act on the pipe stop body for biasing the pipe stop body toward the opening of the cup. Also by way of example, a cup spring acting on the cup for biasing the cup toward the pipe stop body. In an example embodiment the pipe stop body comprises a plate engageable with the pipe element received within the central space. A plurality of legs project from the plate. The ring is attached to the legs. The ring is arranged coaxially with the central axis. The cup comprises a plurality of slots extending axially along the central axis. The legs extend through the slots in this example.

An example embodiment may further comprise a shaft positioned coaxially with the central axis. The cup and the pipe stop body surround the shaft. Further by way of example, each of the cam surfaces may comprise a region of constant radius positioned adjacent to a respective one of the discontinuities. An example embodiment may comprise a plurality of the traction surfaces. Each one of the traction surfaces extends around a respective one of the cam bodies.

An example embodiment may further comprise a plurality of the first cam stop surfaces. Each one of the first cam stop surfaces is positioned adjacent to a respective one of the discontinuities of one of the cam surfaces on each one of the cam bodies. An example embodiment may further comprise a plurality of ribs. Each rib projects from a respective one of the cam bodies. The ribs extend around a portion of the cam bodies. Each first stop surface is positioned on an end of each of the ribs. By way of example the traction surface is positioned on the one cam body in spaced relation to the cam surface extending around the one cam body. In an example embodiment the traction surface has a constant radius measured from the first axis of rotation of the one cam body. Further by way of example the cam surface on the one cam body is positioned between the gear and the traction surface on the one cam body. In another example the cam surface on the one cam body is positioned proximate to the traction surface on the one cam body. Further by way of example the first cam stop surface is positioned between the cam surface and the gear on the one cam body.

An example embodiment of the device according to the invention may further comprise a first action surface positioned on a first one of the cam bodies of the plurality of cam bodies. The first action surface is offset from a first one of the first axes of rotation about which the first one of the cam bodies rotates. An actuator is movably mounted on the housing. The actuator is movable into engagement with the first action surface for rotating the first one of the cam bodies about the first one of the first axes of rotation. In an example embodiment the actuator comprises a first lever pivotably mounted on the housing. The first lever has a drive surface engageable with the first action surface for rotating the first one of the cam bodies about the first one of the axes. A second action surface may be positioned on a second one of the cam bodies of the plurality of cam bodies. The second action surface is offset from a second one of the first axes of rotation about which the second one of the cam bodies rotates. An over travel stop is movably mounted on the housing. The over travel stop is movable into engagement with the second action surface for halting rotation the second one of the cam bodies about the second one of the first axes of rotation. In an example embodiment the over travel stop comprises a second lever mounted on the housing for pivoting motion about a pivot axis. A hook is mounted on the second lever and positioned on one side of the pivot axis. The hook is engageable with the second action surface. A spur is mounted on the second lever on an opposite side of the pivot axis. The first lever is movable into engagement with the spur for pivoting the second lever to move the hook out of engagement with the second action surface upon movement of the first lever into engagement with the first action surface. A return spring acts between the housing and the second lever for biasing the hook into engagement with the second action surface.

An example embodiment further comprises a chuck for receiving the pipe element. The chuck is rotatable about a chuck axis. The chuck axis is arranged coaxially with the central axis. The housing is pivotably and axially slidably mounted adjacent to the chuck. A motor is engaged with the chuck for rotating the chuck about the chuck axis in this example.

The invention further encompasses an example device for cold working a pipe element comprising a housing. A plurality of cam gears are mounted within the housing. Each one of the cam gears is rotatable about a respective one of a plurality of first axes of rotation. The first axes of rotation are parallel to one another. The cam gears are positioned about a central axis surrounded by a central space for receiving the pipe element. The example comprises a plurality of cam bodies, each mounted on a respective one of the cam gears. A plurality of cam surfaces each extend around a respective one of the cam bodies and are engageable with the pipe element received within the central space. Each one of the cam surfaces comprises a region of increasing radius and a discontinuity of the cam surface. A first cam stop surface projects from one of the cam bodies. A pipe stop body is positioned within the central space. The pipe stop body is engageable with the pipe element received within the central space. The pipe stop body is movable along the central axis relatively to the cam bodies between a first position engageable with the first cam stop surface, thereby limiting rotation of the cam bodies, and a second position, not engageable with the first cam stop surface, thereby permitting rotation of the cam bodies.

In an example embodiment, the radius of each cam surface is measured from the respective first axis of rotation of a respective the cam gear. Further by way of example, the pipe stop body comprises a ring arranged coaxially with the central axis. The ring is engageable with the first cam stop surface and thereby limits rotation of the cam bodies when the pipe stop body is in the first position. The ring is not engageable with the first cam stop surface when the pipe stop body is in the second position, thereby permitting rotation of the cam bodies. By way of example the first cam stop surface is positioned adjacent to the discontinuity of the cam surface on the one cam body. An example embodiment further comprises a rib projecting from the one cam body. The rib is positioned adjacent to the cam surface on the one cam body and extends around a portion of the one cam body. The first cam stop surface is positioned on a first end of the rib.

An example embodiment may further comprise a second cam stop surface positioned on a second end of the rib. The second cam stop surface projects from the one cam body. The second cam stop surface is positioned in spaced relation to the first cam stop surface. By way of example, at least one of the first and second cam stop surfaces has a concave curvature. An example embodiment further comprises a cup surrounding the central axis and defining an opening for receiving the pipe element upon insertion of the pipe element into the central space. The pipe stop body is positioned within the cup. The cup is movable along the central axis relatively to the cam bodies. In an example embodiment the cup comprises an inner surface having a first diameter at the opening and a second diameter distal to the opening. The first diameter is greater than the second diameter in this example. In a further example the inner surface is conical. A stop spring acts on the pipe stop body for biasing the pipe stop body toward the opening of the cup. In a further example a cup spring acts on the cup for biasing the cup toward the pipe stop body. In an example embodiment the pipe stop body comprises a plate engageable with the pipe element received within the central space. A plurality of legs project from the plate in this example. A ring is being attached to the legs. The ring is arranged coaxially with the central axis. The cup comprises a plurality of slots extending axially along the central axis. The legs extend through the slots. The ring is engageable with the first cam stop surface and thereby limits rotation of the cam bodies when the pipe stop body is in the first position. The ring is not engageable with the first cam stop surface when the pipe stop body is in the second position, thereby permitting rotation of the cam bodies. An example embodiment further comprises a shaft positioned coaxially with the central axis. The cup and the pipe stop body surround the shaft.

An example embodiment may further comprise a plurality of synchronization gears mounted within the housing. Each one of the synchronization gears is rotatable about a respective one of a plurality of second axes of rotation. The second axes of rotation are parallel to the first axes of rotation wherein each one of the synchronization gears meshes with two of the cam gears. In an example embodiment, the number of synchronization gears is one less than the number of cam gears. By way of example, a device may comprise at most five of the cam gears and at most four of the synchronization gears. In an example embodiment each of the cam surfaces may further comprise a region of constant radius positioned adjacent to a respective one of the discontinuities. An example embodiment may further comprise a plurality of the traction surfaces. Each one of the traction surfaces extends around a respective one of the cam bodies. A further embodiment comprises a plurality of the first cam stop surfaces. Each one of the first cam stop surfaces is positioned adjacent to a respective one of the discontinuities of one of the cam surfaces on each one of the cam bodies.

An example embodiment may further comprises a plurality of ribs. Each rib projects from a respective one of the cam bodies. The ribs extend around a portion of the cam bodies. Each first stop surface is positioned on an end of each of the ribs. By way of example the traction surface overlies one of the cam surfaces. The traction surface may be positioned on the one cam body in spaced relation to the cam surface extending around the one cam body. In an example embodiment the traction surface has a constant radius measured from the first axis of rotation of the one cam body. In an example embodiment the cam surface on the one cam body is positioned between the gear and the traction surface on the one cam body. The cam surface on the one cam body is positioned proximate to the traction surface on the one cam body in an example embodiment. By way of further example, the first cam stop surface is positioned between the cam surface and the gear on the one cam body.

An example embodiment may further comprise a first action surface positioned on a first one of the cam bodies of the plurality of cam bodies. The first action surface is offset from a first one of the first axes of rotation about which the first one of the cam bodies rotates. An actuator may be movably mounted on the housing. The actuator is movable into engagement with the first action surface for rotating the first one of the cam bodies about the first one of the first axes of rotation. In an example embodiment the actuator comprises a first lever pivotably mounted on the housing. The first lever has a drive surface engageable with the first action surface for rotating the first one of the cam bodies about the first one of the axes. A second action surface is positioned on a second one of the cam bodies of the plurality of cam bodies. The second action surface is offset from a second one of the first axes of rotation about which the second one of the cam bodies rotates. An over travel stop is movably mounted on the housing. The over travel stop is movable into engagement with the second action surface for halting rotation the second one of the cam bodies about the second one of the first axes of rotation. In an example embodiment the over travel stop comprises a second lever mounted on the housing for pivoting motion about a pivot axis. A hook is mounted on the second lever and positioned on one side of the pivot axis. The hook is engageable with the second action surface. A spur is mounted on the second lever on an opposite side of the pivot axis. The first lever is movable into engagement with the spur for pivoting the second lever to move the hook out of engagement with the second action surface upon movement of the first lever into engagement with the first action surface. A return spring acts between the housing and the second lever for biasing the hook into engagement with the second action surface.

An example device may further comprise a chuck for receiving the pipe element. The chuck is rotatable about a chuck axis. The chuck axis is arranged coaxially with the central axis. In an example embodiment the housing is pivotably and axially slidably mounted adjacent to the chuck. The example embodiment may further comprise a motor engaged with the chuck for rotating the chuck about the chuck axis.

DETAILED DESCRIPTION

Figure 1:
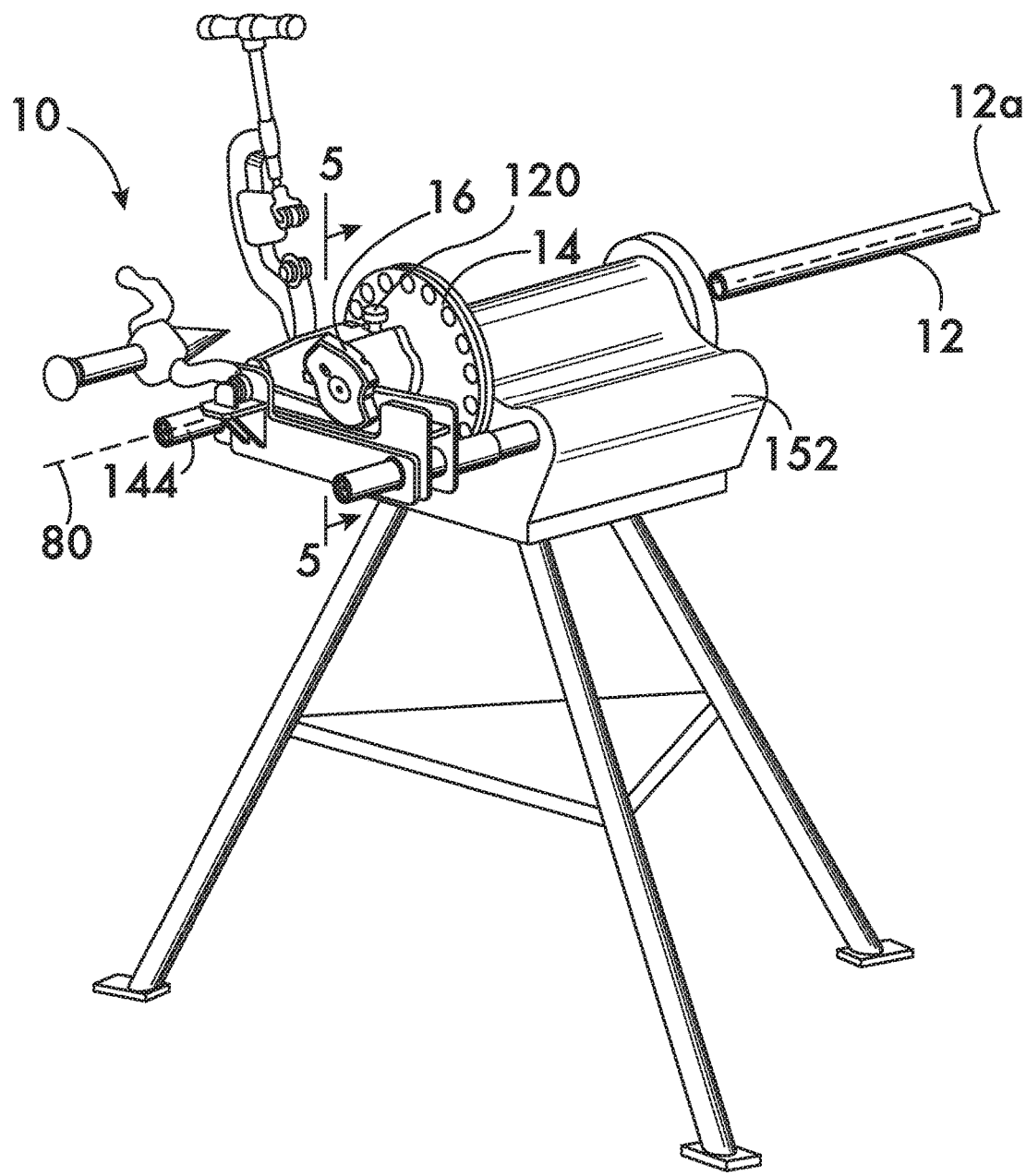
FIG. 1 is an isometric view of an example device according to the invention mounted on a power chuck.

FIG. 1 shows an example device 10 for cold working a pipe element 12, for example, forming a circumferential groove in the pipe element's outer surface. Device 10 is shown mounted on a rotating power chuck 14. Such chucks are well known, an example being the Ridgid 300 Power Drive marketed by Ridgid of Elyria, Ohio. Chuck 14 receives and turns the pipe element 12 as described below.

Figure 2:
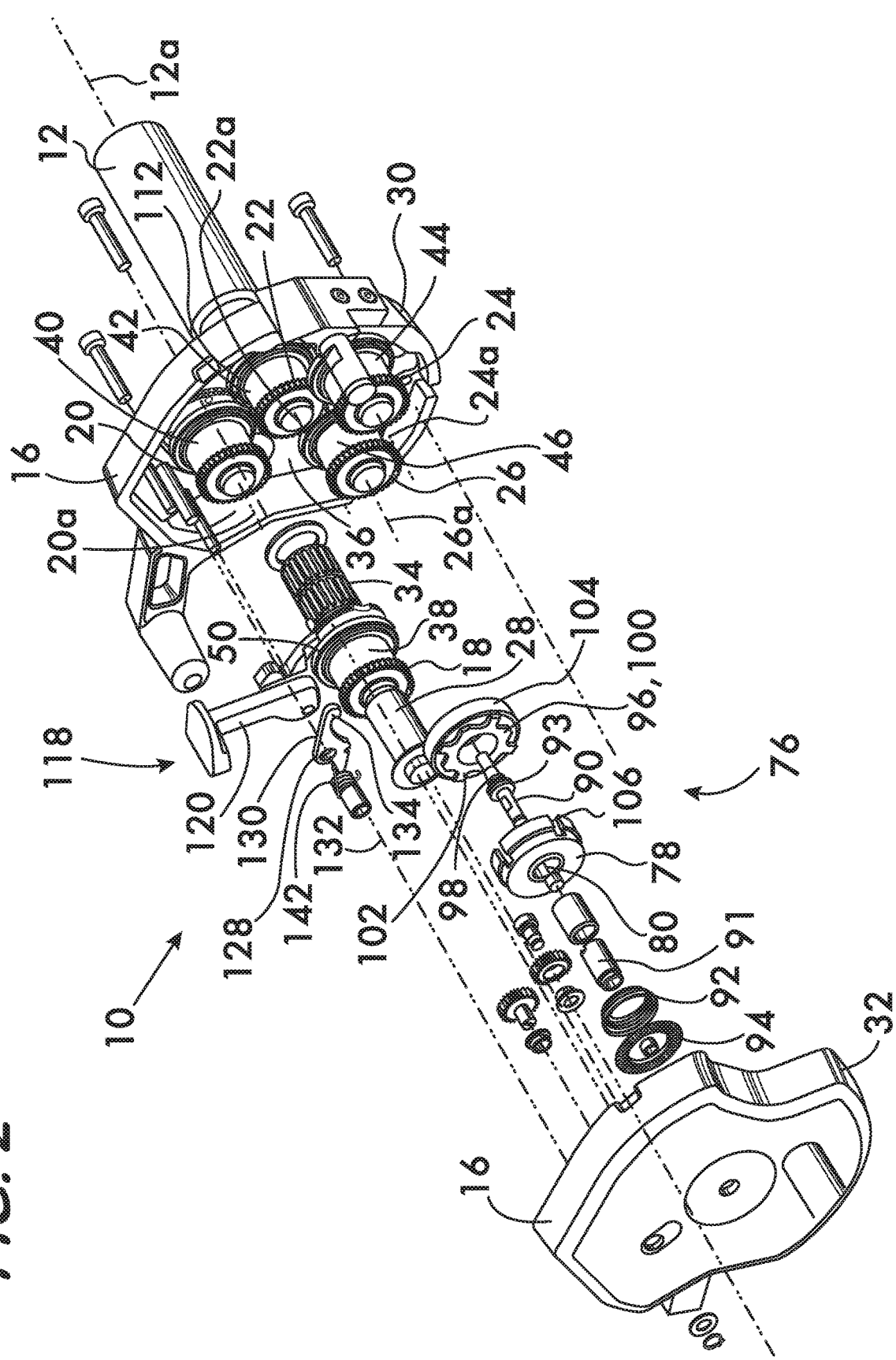
FIG. 2 is an exploded isometric view of the example device shown in FIG. 1.

As shown in FIG. 2, device 10 comprises a housing 16. A plurality of cam gears, in this example five cam gears 18, 20, 22, 24 and 26 are mounted within the housing 16. Each one of the cam gears is rotatable about a respective axis of rotation 18a, 20a, 22a, 24a and 26a. These first axes of rotation 18a, 20a, 22a, 24a and 26a are oriented substantially parallel to one another and substantially parallel to the longitudinal axis 12a of pipe element 12. In a practical design the cam gears 18, 20, 22, 24 and 26 are mounted on respective shafts 28. The shafts 28 extend between front and rear housing portions 30 and 32, and each cam gear rotates on a bearing 34 coaxially mounted on the shaft 28. The cam gears 18, 20, 22, 24 and 26 are positioned about a central space 36 for receiving the pipe element 12.

Device 10 further comprises a plurality of cam bodies, in this example five cam bodies 38, 40, 42, 44, and 46. Each cam body is mounted on a respective one of the cam gears 18, 20, 22, 24, 26 and 28. As shown by way of example for cam body 38 on cam gear 18, each cam body comprises a cam surface 50. Each cam surface 50 extends around a respective one of the cam bodies and is engageable with the pipe element 12 when received within the central space 36.

Figure 3:
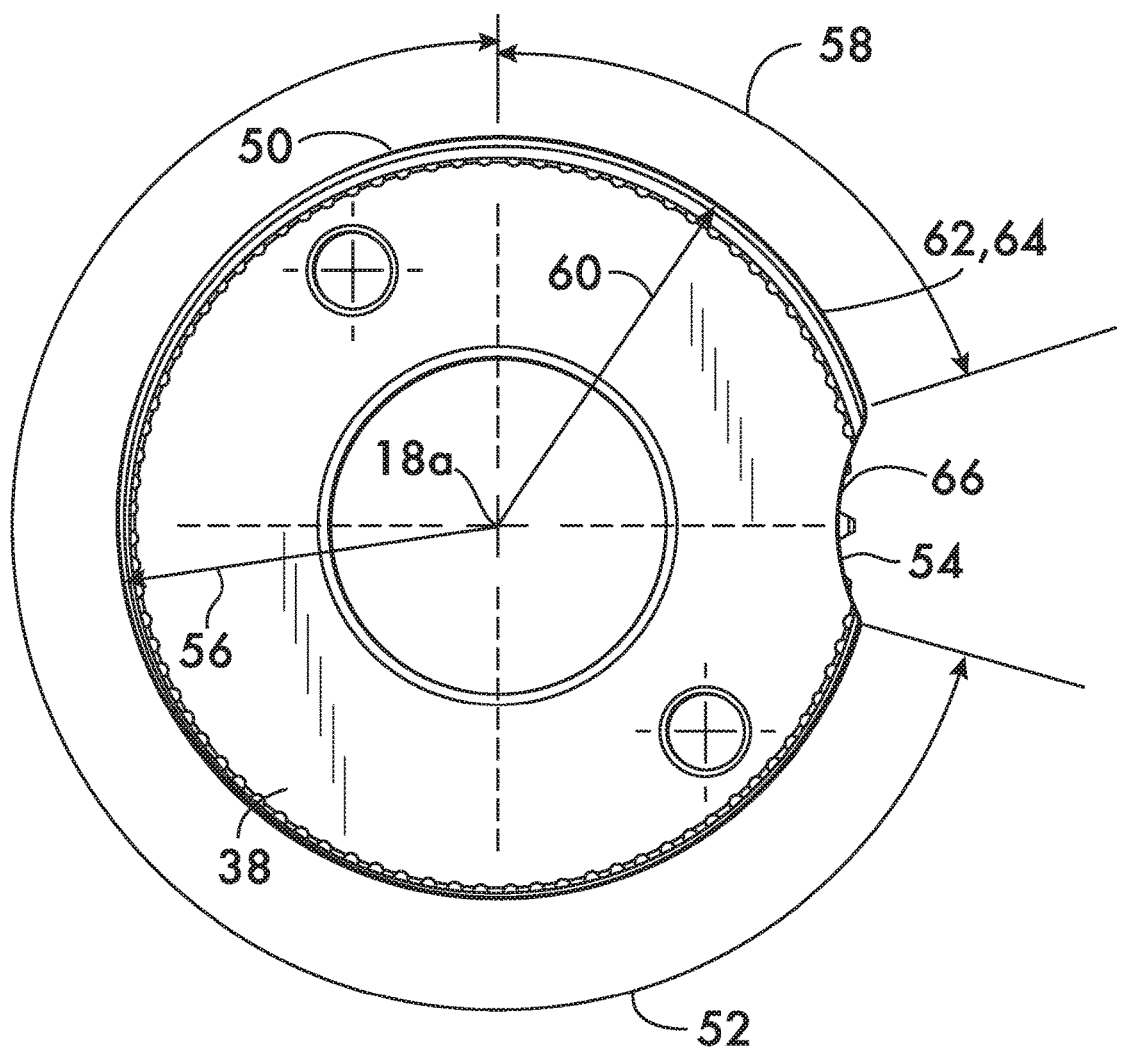
FIG. 3 is a axial view of a cam body component used in the device according to the invention.

As shown in FIG. 3 using cam body 38 by way of example, each one of the cam surfaces 50 comprises a region of increasing radius 52 and a discontinuity 54 of the cam surface 50. The radius 56 of each cam surface is measured from a respective one of the axes of rotation 18a, 20a, 22a, 24a, 26a and 28a; in the example shown the radius 56 is measured from axis 18a. Each cam surface 50 may also comprise a region of constant radius 58, the constant radius being designated by reference numeral 60. In a practical design the region of constant radius 58 for each cam surface 50 may advantageously be positioned adjacent to a respective one of the discontinuities 54 of the cam surfaces 50.

Figure 4:
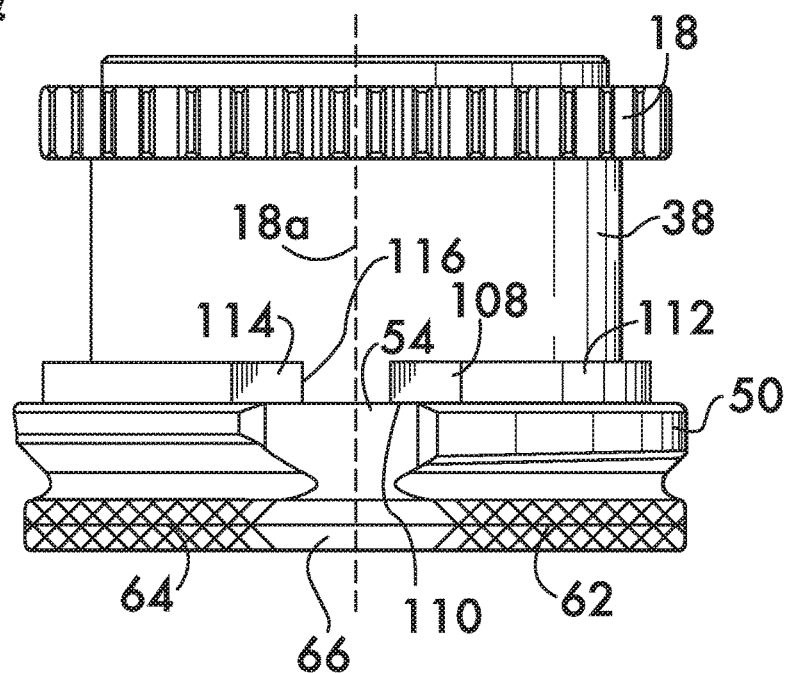
FIG. 4 is an side view of the cam body component shown in FIG. 3.

As shown in FIGS. 3 and 4, a traction surface 62 extends around at least one of the cam bodies, in this example cam body 38. The traction surface 62 comprises a plurality of projections 64 extending outwardly from the cam body 38. The projections may be formed by knurling and provide mechanical engagement and purchase between the cam body 38 and the pipe element 12 upon engagement. Unlike the cam surface 50, the traction surface 62 may have a constant radius measured from the axis of rotation 18a of the cam gear 18. The traction surface 62 also has a gap 66 therein. Gap 66 is aligned axially with the discontinuity 54 of the cam surface 50. As shown in FIG. 4, it is considered advantageous to position the cam surface 50 between the cam gear 18 and the traction surface 62 with the cam surface being positioned proximate to the traction surface. The example embodiment of device 10 shown in FIG. 2 comprises a plurality of traction surfaces 62 on respective cam bodies 38, 40, 42, 44, and 46.

Figure 5:
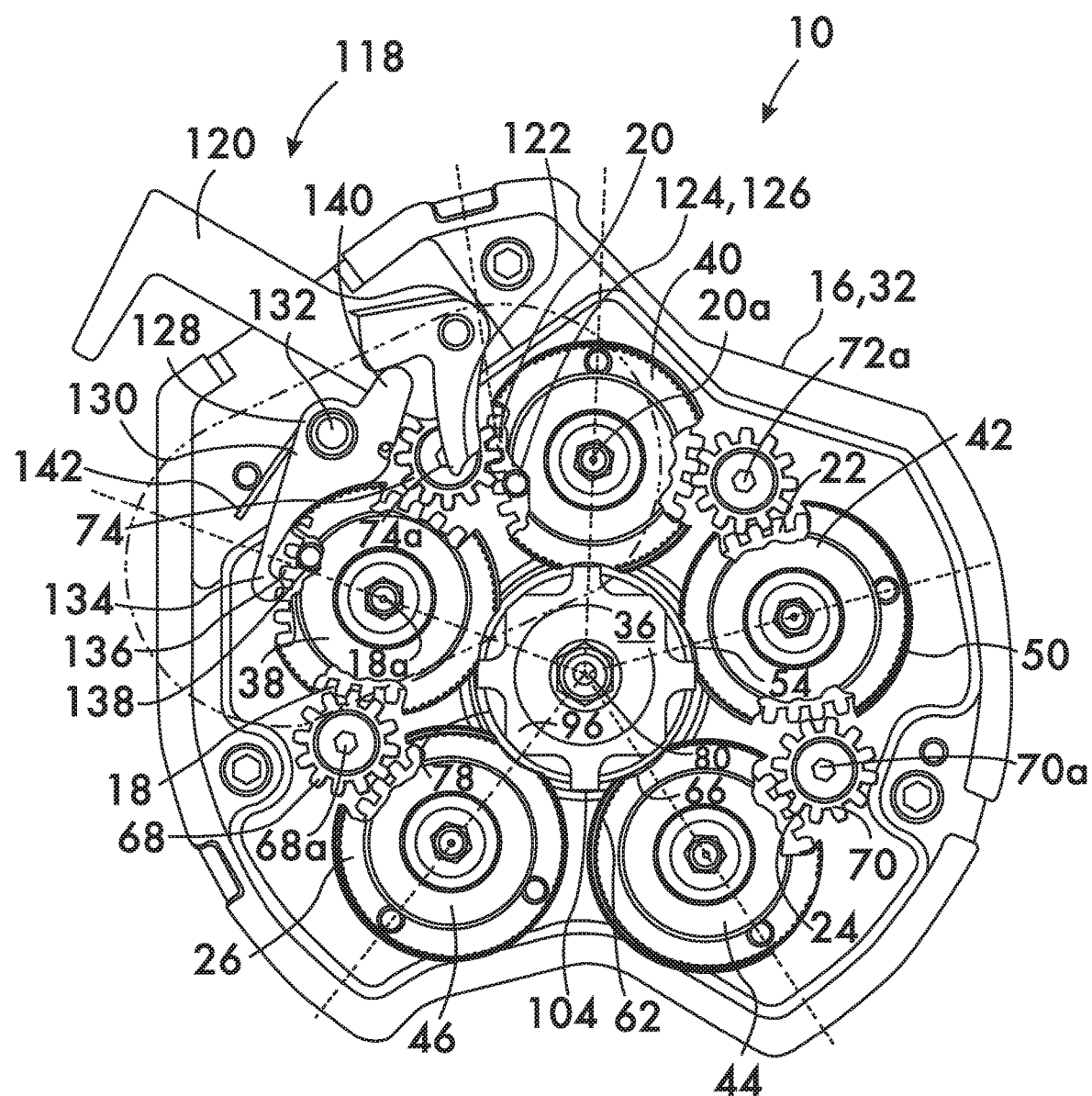
FIG. 5 is a cross sectional view taken at line 5-5 of FIG. 1.

As shown in FIG. 5, device 10 further comprises a plurality of synchronization gears, in this example four synchronization gears 68, 70, 72 and 74 mounted within the housing 16. Each synchronization gear is rotatable about a respective axis of rotation 68a, 70a, 72a and 74a. These second axes of rotation are substantially parallel to the first axes of rotation 18a, 20a, 22a, 24a, 26a and 28a of the cam gears. Each one of the synchronization gears 68, 70, 72 and 74 meshes with two of the cam gears to ensure that all of the cam gears and their associated cam bodies rotate together and also remain aligned relatively to one another when both rotating and stationary for proper operation of device 10 as described below. Cam gear synchronization requires one less synchronization gear than the number of cam gears. Thus in the example device 10 comprising at most five of the cam gears only four synchronization gears are required.

Figure 6:
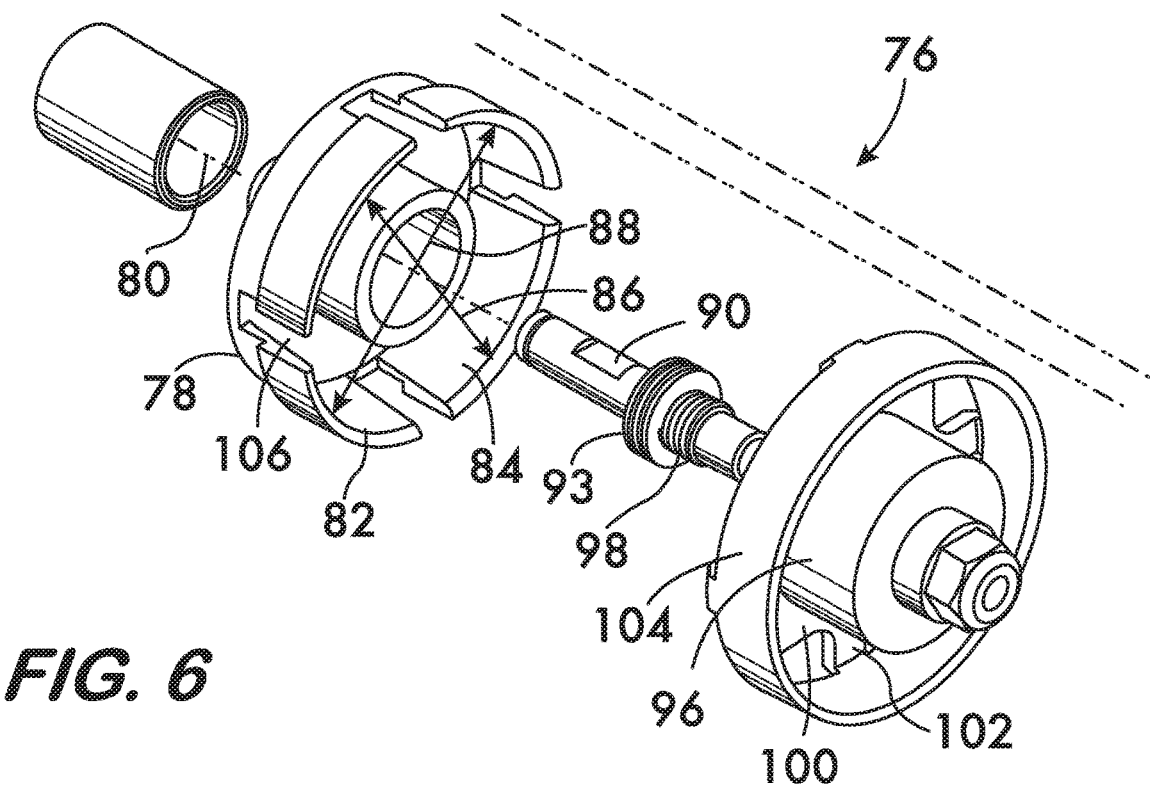
FIG. 6 is an isometric view of a pipe element engagement assembly used in the device shown in FIG. 1.
Figure 12:
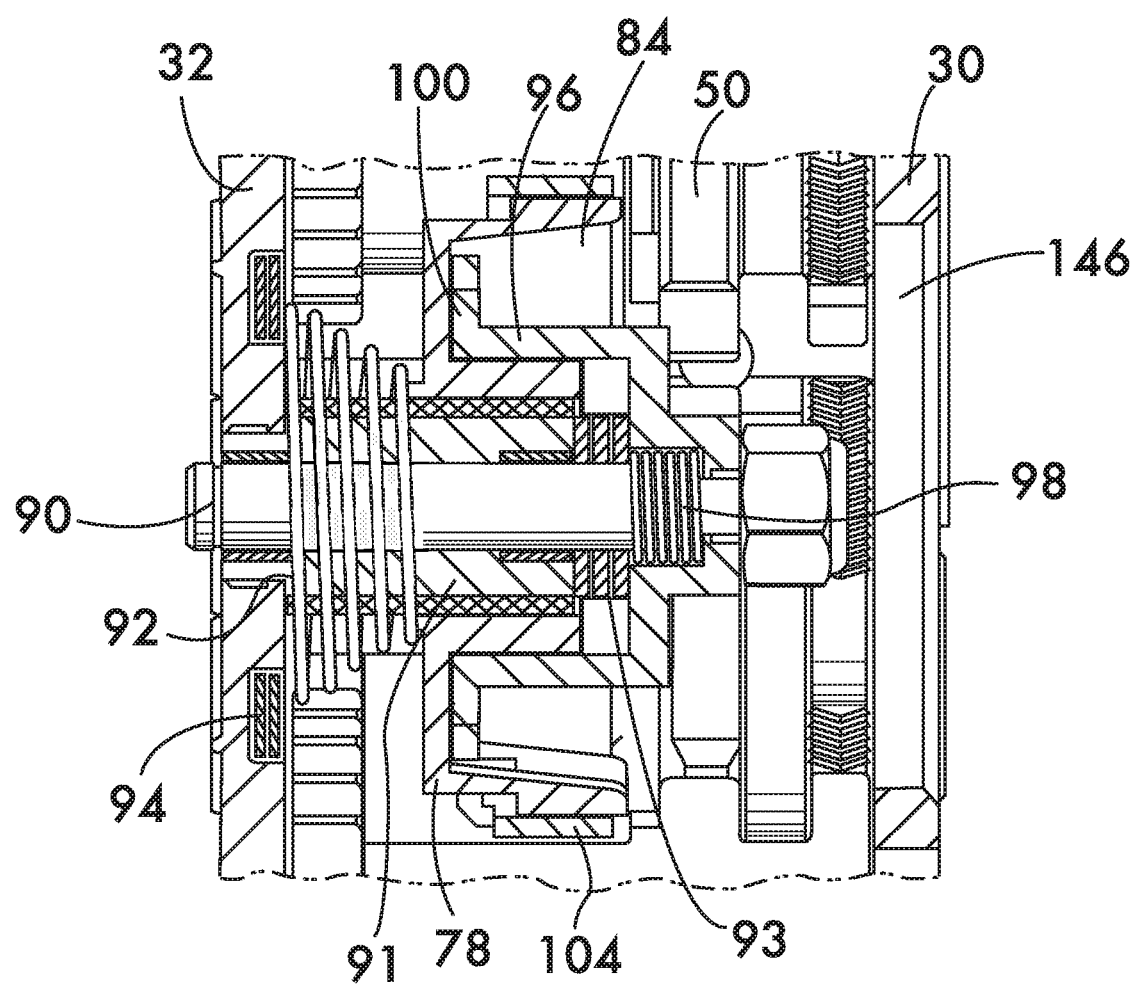
FIG. 12 is a partial sectional view of the pipe element engagement assembly of FIG. 6.

As shown in FIG. 2, device 10 further comprises an engagement assembly 76 positioned within the central space 36. Pipe element 12 contacts the engagement assembly upon insertion of the pipe element into the central space as described below. As shown in FIG. 6, engagement assembly 76 comprises a cup 78. Cup 78 surrounds a central axis 80 arranged coaxially with the central space 36. Cup 78 defines an opening 82 for receiving the pipe element 12 upon insertion of the pipe element into the central space 36. In this example embodiment the cup 78 comprises an inner surface 84 having a first diameter 86 at opening 82 and a second diameter 88 distal to the opening. The first diameter is greater than the second diameter. It is furthermore thought advantageous that inner surface 84 be substantially conical to accommodate a range of pipe diameter tolerances. As shown in FIGS. 2 and 12 cup 78 is mounted coaxially with a shaft 90 which is mounted within a tubular projection 91 attached to the rear housing portion 32. Shaft 90 is arranged coaxially with the central axis 80. Cup 78 is movable along central axis 80 relative to the shaft 90 and the cam bodies. As shown in FIGS. 2 and 12, a cup spring 92 acts between the cup 78 and the rear housing portion 32 for biasing the cup away therefrom. It is advantageous to position a thrust bearing 94 between the rear housing portion 32 and the cup spring 92 to protect the cup spring should the cup spring and cup rotate together during device operation. Cup spring 92 in this example embodiment is a conical spring to permit a maximum range of axial motion to the cup 78.

As further shown in FIGS. 2, 6 and 12, the engagement assembly 76 also comprises a pipe stop body 96 positioned within the cup 78. Pipe stop body 96 is mounted on shaft 90 and is movable relatively to the shaft, the cup and the cam bodies along the central axis 80. A stop spring 98 acts between the tubular projection 91 and the pipe stop body 96 for biasing the pipe stop body toward the opening 82 defined by cup 78. It is advantageous to interpose a thrust bearing 93 between the tubular projection 91 and both the stop spring 98 and the pipe stop body 96. In the example embodiment shown, the pipe stop body 96 comprises a plate 100 engageable with the pipe element 12 when it is received within the central space 36. A plurality of legs 102 project from plate 100 and a ring 104 is attached to the legs. Ring 104 is arranged coaxially with the central axis 80. Cup 78 defines a plurality of slots 106 which extend in a direction axially along the central axis 80. The slots 106 accommodate the legs 102 which extend through said slots, thereby permitting relative motion along the central axis 80 between the pipe stop body 96 and the cup 78.

Figure 7:
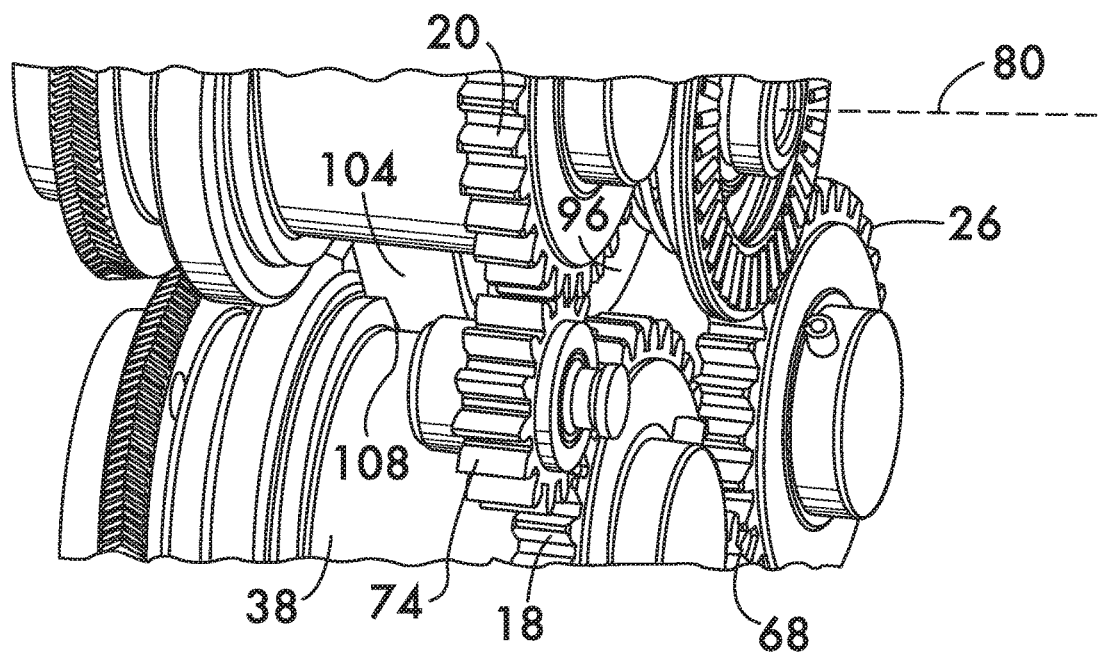
FIGS. 7 and 8 are isometric views of a portion of the device shown in FIG. 1 illustrating an aspect of device operation.
Figure 8:
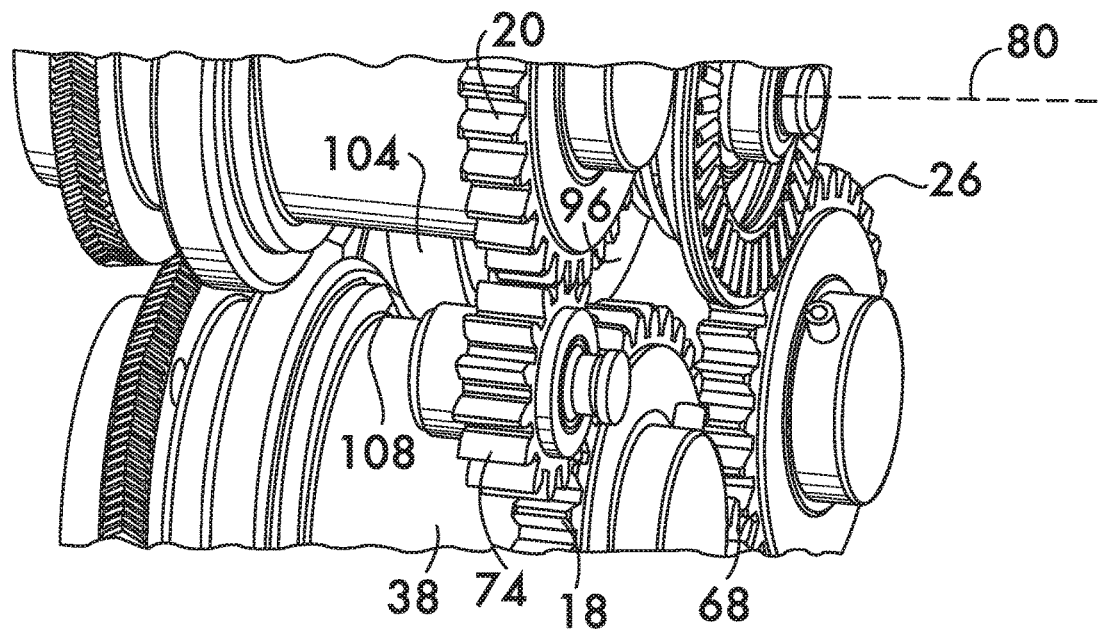

As shown in FIGS. 6 and 7, mounting the ring 104 on legs 102 permits the ring to have a larger diameter than the cup 78 for engaging a first cam stop surface 108 projecting from one of the cam bodies 38 (see also FIG. 4). As shown by a comparison of FIGS. 7 and 8, because the pipe stop body 96 is movable axially along central axis 80, the ring 104 is movable relatively to the cam body 38 between a first position (FIG. 7) wherein the ring 104 is engageable with or engages the first cam stop surface 108, thereby limiting rotation of the cam body 38, and a second position (FIG. 8), wherein the ring 104 is not engageable with the first cam stop surface 108, thereby permitting rotation of the cam body 38. Note that due to the action of synchronization gears 68, 70, 72, and 74 (see FIG. 5), if any one cam body such as cam body 38 is limited in rotation then all of the cam bodies are similarly limited in rotation.

As shown in FIG. 4, the first cam stop surface 108 is advantageously positioned adjacent to the discontinuity 54 of the cam surface 50 on the cam body 38. It is convenient to position the first cam stop surface 108 on a first end 110 of a rib 112 projecting from cam body 38. In this example embodiment the rib 112 is positioned adjacent to the cam surface 50 on the cam body 38 and extends around a portion of it. It is further considered advantageous to position a second cam stop surface 114 on a second end 116 of rib 112. The second cam stop surface 114 also projects from the cam body 38, and is positioned in spaced relation to the first cam stop surface 108. Use of first and second cam stop surfaces 108 and 114 limits rotation of the cam bodies in either direction when the pipe stop body 96 is in the first position (FIG. 7), wherein ring 104 is engaged with or engageable with either cam stop surface. It is thought advantageous if the first and second cam stop surfaces 108 and 114 each has a concave curvature, which can be matched to the curvature of the ring 104.

Although a practical design of device 10 may have first and second cam stop surfaces positioned at the end of a rib on one cam body, it is also feasible to employ a plurality of first and second cam stop surfaces 108 and 114 positioned on a plurality of ribs 112 on a plurality of cam bodies as shown in FIG. 2.

Operation of the device 10 is enhanced through the use of an actuator 118 movably mounted on the housing 16 as shown in FIGS. 2 and 5. In this example embodiment the actuator 118 comprises a first lever 120 pivotably mounted on the housing 16. First lever 120 has a drive surface 122 engageable with a first action surface 124 positioned on a first one of the cam bodies, cam body 40 in this example. The first action surface 124 is offset from the axis 20a about which the cam body 40 rotates. It is convenient to use a pin 126 mounted on the cam body 40 to form the action surface 124. The first lever 120 is pivotable so that its drive surface 122 engages the first action surface 124. As the first action surface is offset from the axis of rotation 20a, engagement between the drive surface and the action surface applies a torque to the cam body 40 rotating it about its axis of rotation. The actuator 118 is used to initiate engagement between the pipe element 12 and the traction surface or surfaces 62 so that the cam surfaces cold work the pipe element as described below.

It is further advantageous to include an over travel stop 128 on the device 10. As further shown in FIGS. 2 and 5, an example over travel stop 128 comprises a second lever 130 mounted on the housing 16 for pivoting motion about a pivot axis 132. A hook 134 is mounted on the second lever 130 and is positioned on one side of the pivot axis 132. Hook 134 is engageable with a second action surface 136 positioned on a second one of the cam bodies, in this example cam body 38. The second action surface 136 is also offset from the axis of rotation 18a about which the second cam body 38 rotates, thus allowing the hook 134 to exert a torque on the second cam body to halt its rotation. It is convenient to use a second pin 138 mounted on the second cam body 38 to define the second action surface 136. Over travel stop 128 further comprises a spur 140 mounted on the second lever 130. Spur 140 is positioned on an opposite side of the pivot axis 132 from hook 134. The first lever 120 is movable into engagement with the spur 140 for pivoting the second lever 130 to move the hook 134 out of engagement with the second action surface 136. This engagement between lever 120 and spur 140 occurs upon movement of the first lever placing its drive surface 122 into engagement with the first action surface 124 to initiate a return motion of the cam bodies. A return spring 142 acts between the housing 16 and the second lever 130 for biasing the hook 134 into engagement with the second action surface 136.

Figure 9:
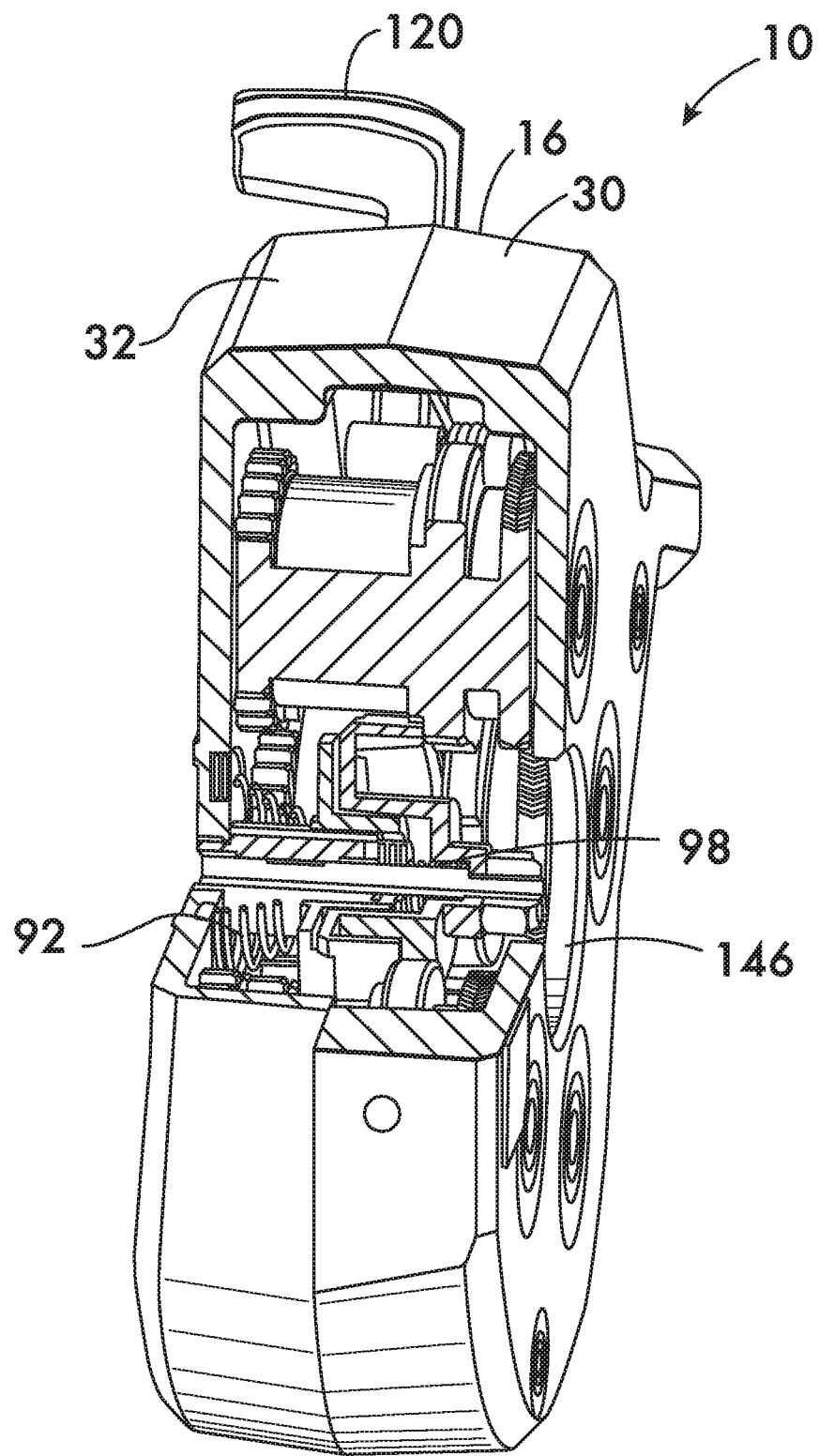
FIGS. 9-11 are partial cut-away isometric views illustrating operation of the device shown in FIG. 1.

Operation of device 10 begins, as shown in FIG. 1, with the pipe element 12 inserted into the power chuck 14. Pipe element 12 is positioned so that its end extends from the front of the power chuck in proximity to device 10, whereupon the chuck grips the pipe element. Device 10 is in the configuration as shown in FIG. 5. The cam bodies 38, 40, 42, 44 and 46 are oriented such that the discontinuities 54 of the cam surfaces 50 and the gaps 66 of the traction surface or surfaces 62 all face the central axis 80. This configuration of the cam bodies provides clearance which allows the pipe element 12 to be received within the central space 36. The cam bodies are maintained in this configuration through limits on their position established by a combination of features including: 1) the ring 104 potentially engaging one or both of the first and second cam stop surfaces 108 and 114 (not shown) on one or more of the cam bodies; 2) hook 134 potentially engaging the second action surface 136 and 3) the synchronization gears 68, 70, 72 and 74. As shown in FIG. 9, both the cup 78 and the pipe stop body 96 are biased into their furthest position away from the rear housing portion 32 by their respective cup spring 92 and stop spring 98. As shown in FIG. 5 the first lever 120 of the actuator 118 is positioned with its drive surface 122 ready to engage the first action surface 124 on cam body 40. As shown in FIG. 1, device 10 is positioned on the power chuck 14 such that the pipe's longitudinal axis 12a is aligned with the device's central axis 80.

Figure 10:
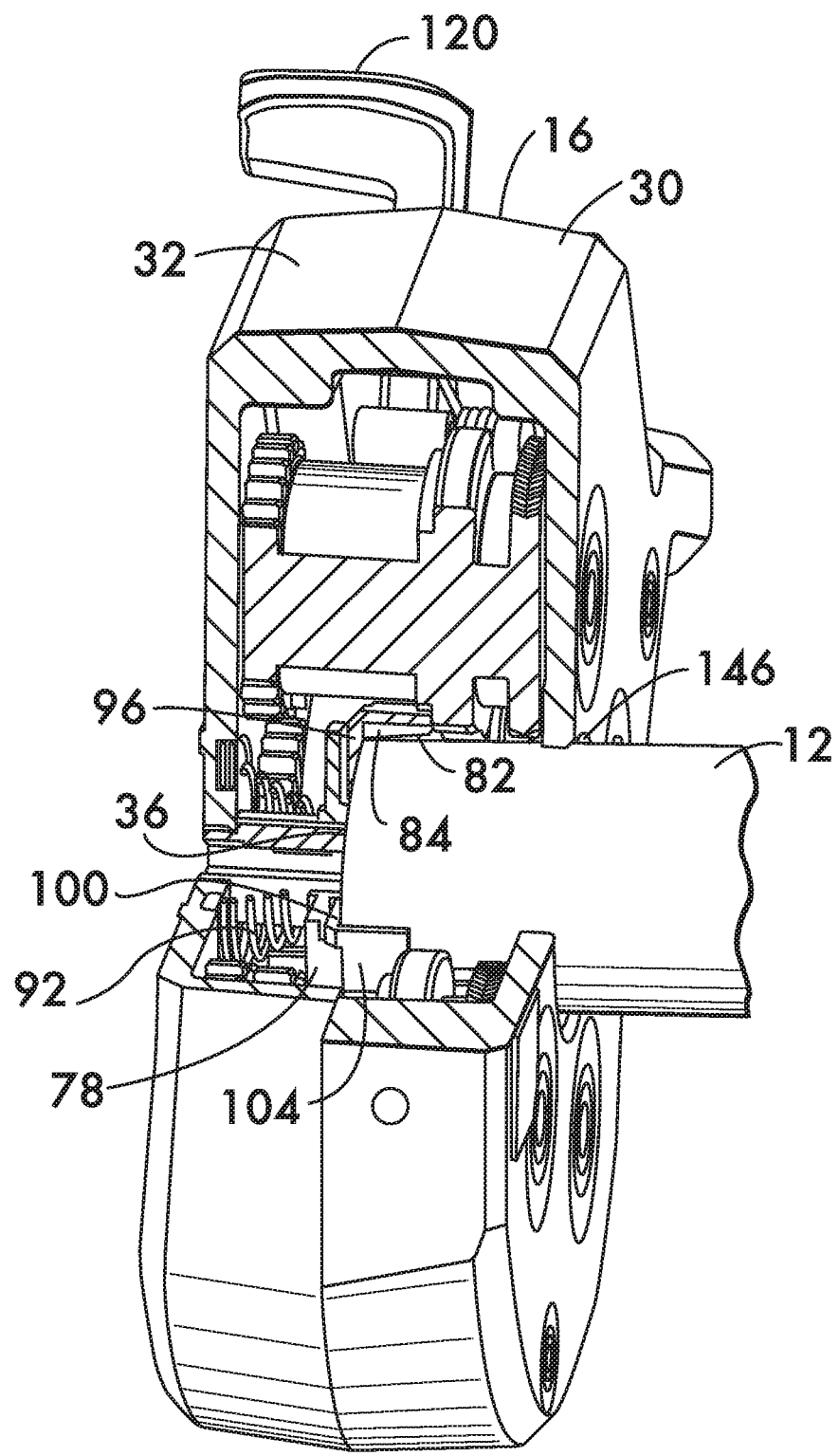

As shown in FIG. 10, device 10 is then moved into engagement with the end of pipe element 12 by sliding the housing 16 along mounting rails 144 (see FIG. 1) so that the pipe element is received within the central space 36 through an opening 146 in the front housing portion 30. Upon further motion of device 10 the pipe element 12 is received within the cup 78. Depending upon where its diameter falls within the tolerance range the pipe element will engage the cup's inner surface 84 somewhere between the cup opening 82 and the pipe stop body 96. Engagement between the pipe 12 and the cup 78 functions to mitigate pipe end flare and also limits the tendency of the pipe element to go "out of round" during the cold working process.

Figure 11:
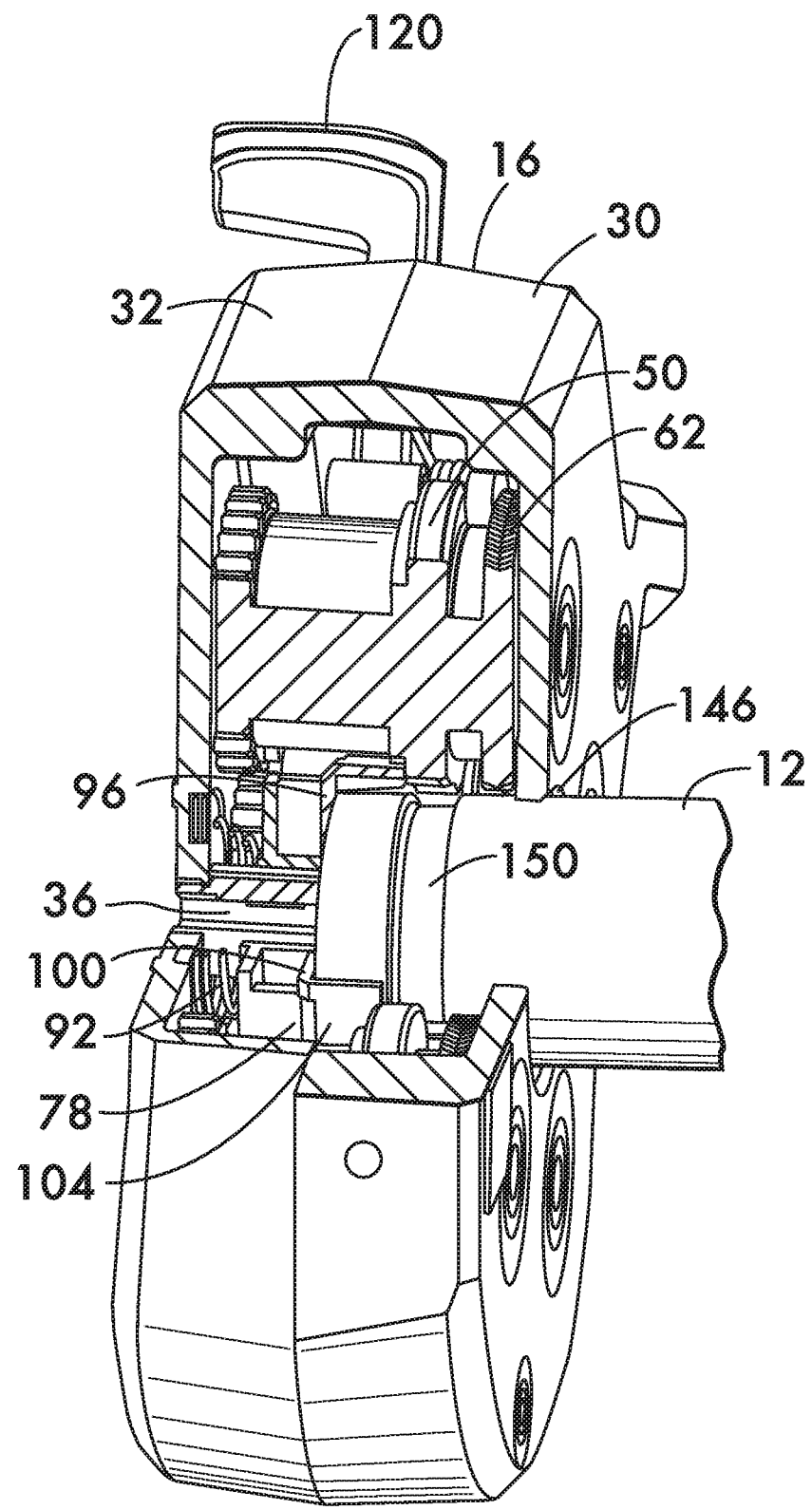

Further motion of the device 10 relatively to the pipe element 12 moves cup 78 relatively to the housing 16, compressing the cup spring 92 and allowing the pipe element to engage the plate 100 of pipe stop body 96. Continued motion of the pipe element 12 moves the pipe stop body 96 relatively to housing 16 until, as shown in FIGS. 11 and 12, the plate 100 engages the thrust bearing 93 which surrounds the shaft 90 and abuts the tubular projection 91 extending from rear housing portion 32 (FIG. 12). Thrust bearing 148 is positioned so as to position the pipe element 12 relative to the cam surfaces 50 so that, when the plate 100 and thrust bearing 148 engage, a circumferential groove 150 will be formed in the pipe element at a desired distance from the end of the pipe element when the device 10 is actuated. Displacement of the pipe stop body 96 against the thrust bearing 148 also moves the ring 104 from the position shown in FIG. 7, wherein the ring engages or is engageable with the first cam stop surface or surfaces 108, to the position shown in FIG. 8 where the ring 104 cannot engage the cam stop surface or surfaces.

Actuation of device 10 occurs by using a motor 152 (see FIG. 1) to rotate the power chuck 14, thereby rotating the pipe element 12. Pipe element 12 may be rotated as soon as it is gripped by chuck 14, or rotation may be started after the pipe element is engaged with the device 10. As the pipe element rotates the actuator's first lever 120 is pushed. This action has two effects: 1) the first lever 120 engages the spur 140 of the second lever 130 (see FIG. 5) thereby pivoting the second lever such that the hook 134 disengages from the second action surface 136, allowing the cam bodies to rotate; and 2) moving the lever's drive surface 122 into engagement with the first action surface 124 of cam body 40, causing all of the cam bodies 38, 40, 42, 44, and 46 to rotate through a small angular displacement by the action of the synchronizing gears 68, 70, 72 and 74. This rotation of the cam bodies engages the one or more traction surfaces 62 with the pipe element 12, which is rotating under power from the chuck 14. Rotation of the pipe element 12 acting on the traction surface or surfaces thus drives rotation of the cam bodies, which kept synchronized in rotation by the synchronization gears 68, 70, 72 and 74. Synchronized rotation of the cam bodies engages the cam surfaces 50 with the pipe element 12, and the circumferential groove 150 is formed as the outer surface of the pipe element 12 is traversed by the regions of increasing radius 56 and regions of constant radius 58 of the cam surfaces 50 (see FIG. 3). As shown in FIG. 11, groove 150 is fully formed after one rotation of the cam bodies 38, 40, 42, 44, and 46. Because they are synchronized by synchronization gears 68, 70, 72 and 74 the cam bodies stop when the discontinuities 54 of the cam surfaces and the gap or gaps 66 of the traction surface or surfaces 62 again face the central axis 80 as shown in FIG. 5. In this position the pipe element 12 is clear of the traction surface or surfaces 62 and the cam surfaces 50 and thus rotation of the pipe element will no longer rotate the cam bodies. Note that upon release of the first lever 120 of the actuator 118 the second lever will be free to pivot so that hook 134 of the over travel stop 128, biased by its return spring 142, may again engage the second action surface 136 of cam body 38 to ensure that the cam bodies stop and the traction surface or surfaces 62 cannot again engage the pipe element 12. At this point the chuck 14 may be halted and the device 10 disengaged from the pipe element 12, and the pipe element, now having a circumferential groove 150, may be removed from the chuck.

It is expected that devices 10 for cold working pipe elements will permit the formation of circumferential grooves in the pipe elements at the desired distance from the end of the pipe element over a range of pipe diameter tolerances while reducing pipe end flare and maintaining the roundness of the pipe element.

What is claimed is:

1. A device for cold working a pipe element, said device comprising:
    a housing;
    a plurality of cam gears mounted within said housing, each one of said cam gears being rotatable about a respective one of a plurality of first axes of rotation, said first axes of rotation being parallel to one another, said cam gears being positioned about a central axis surrounded by a central space for receiving said pipe element;
    a plurality of cam bodies, each said cam body mounted on a respective one of said cam gears;
    a plurality of cam surfaces, each one of said cam surfaces extending around a respective one of said cam bodies and being engageable with said pipe element received within said central space, each one of said cam surfaces comprising a region of increasing radius and a discontinuity of said cam surface;
    a first cam stop surface projecting from one of said cam bodies;
    a pipe stop body positioned within said central space, said pipe stop body being engageable with said pipe element received within said central space, said pipe stop body being movable along said central axis relatively to said cam bodies between a first position engageable with said first cam stop surface, thereby limiting rotation of said cam bodies, and a second position, not engageable with said first cam stop surface, thereby permitting rotation of said cam bodies; and
    a cup surrounding said central axis and defining an opening for receiving said pipe element upon insertion of said pipe element into said central space, said pipe stop body being positioned within said cup, said cup being movable along said central axis relatively to said cam bodies.

2. The device according to claim 1, wherein each said radius of each said cam surface is measured from said respective first axis of rotation of a respective said cam gear.

3. The device according to claim 1, wherein said pipe stop body comprises a ring arranged coaxially with said central axis, said ring being engageable with said first cam stop surface and thereby limiting rotation of said cam bodies when said pipe stop body is in said first position, and wherein said ring is not engageable with said first cam stop surface when said pipe stop body is in said second position, thereby permitting rotation of said cam bodies.

4. The device according to claim 1, wherein said first cam stop surface is positioned adjacent to said discontinuity of said cam surface on said one cam body.

5. The device according to claim 1, further comprising a rib projecting from said one cam body, said rib positioned adjacent to said cam surface on said one cam body and extending around a portion of said one cam body, said first cam stop surface being positioned on a first end of said rib.

6. The device according to claim 5, further comprising a second cam stop surface positioned on a second end of said rib, said second cam stop surface projecting from said one cam body, said second cam stop surface being positioned in spaced relation to said first cam stop surface.

7. The device according to claim 6, wherein at least one of said first and second cam stop surfaces has a concave curvature.

8. The device according to claim 1, wherein said cup comprises an inner surface having a first diameter at said opening and a second diameter distal to said opening, said first diameter being greater than said second diameter.

9. The device according to claim 8, wherein said inner surface is conical.

10. The device according to claim 1, further comprising a stop spring acting on said pipe stop body for biasing said pipe stop body toward said opening of said cup.

11. The device according to claim 10, further comprising a cup spring acting on said cup for biasing said cup toward said pipe stop body.

12. The device according to claim 1, wherein:
    said pipe stop body comprises a plate engageable with said pipe element received within said central space, a plurality of legs projecting from said plate, a ring being attached to said legs, said ring being arranged coaxially with said central axis;
    said cup comprises a plurality of slots extending axially along said central axis, said legs extending through said slots; wherein
    said ring is engageable with said first cam stop surface and thereby limits rotation of said cam bodies when said pipe stop body is in said first position, and wherein said ring is not engageable with said first cam stop surface when said pipe stop body is in said second position, thereby permitting rotation of said cam bodies.

13. The device according to claim 1, further comprising a shaft positioned coaxially with said central axis, said cup and said pipe stop body surrounding said shaft.

14. The device according to claim 1, further comprising a plurality of synchronization gears mounted within said housing, each one of said synchronization gears being rotatable about a respective one of a plurality of second axes of rotation, said second axes of rotation being parallel to said first axes of rotation wherein each one of said synchronization gears meshes with two of said cam gears.

15. The device according to claim 14, wherein the number of synchronization gears is one less than the number of cam gears.

16. The device according to claim 14, comprising at most five of said cam gears.

17. The device according to claim 16, comprising at most four of said synchronization gears.

18. The device according to claim 1, wherein each of said cam surfaces further comprises a region of constant radius positioned adjacent to a respective one of said discontinuities.

19. The device according to claim 1, further comprising a plurality of traction surfaces, each one of said traction surfaces extending around a respective one of said cam bodies.

20. The device according to claim 19, wherein each of said traction surfaces overlies a respective one of said cam surfaces.

21. The device according to claim 19, wherein each of said traction surfaces is positioned on said one cam body in spaced relation to said cam surface extending around said one cam body.

22. The device according to claim 19, wherein each of said traction surfaces has a constant radius measured from said first axis of rotation of said one cam body.

23. The device according to claim 19, wherein said cam surface on said one cam body is positioned between said gear and said traction surface extending around said one cam body.

24. The device according to claim 23, wherein said cam surface on said one cam body is positioned proximate to said traction surface extending around said one cam body.

25. The device according to claim 23, wherein said first cam stop surface is positioned between said cam surface and said gear on said one cam body.

26. The device according to claim 1, further comprising a plurality of said first cam stop surfaces, each one of said first cam stop surfaces being positioned adjacent to a respective one of said discontinuities of one of said cam surfaces on each one of said cam bodies.

27. The device according to claim 26, further comprising a plurality of ribs, each said rib projecting from a respective one of said cam bodies, said ribs extending around a portion of said cam bodies, each said first stop surface being positioned on an end of each of said ribs.

28. The device according to claim 1, further comprising:
a first action surface positioned on a first one of said cam bodies of said plurality of cam bodies, said first action surface being offset from a first one of said first axes of rotation about which said first one of said cam bodies rotates;
an actuator movably mounted on said housing, said actuator being movable into engagement with said first action surface for rotating said first one of said cam bodies about said first one of said first axes of rotation.

29. The device according to claim 28, wherein said actuator comprises a first lever pivotably mounted on said housing, said first lever having a drive surface engageable with said first action surface for rotating said first one of said cam bodies about said first one of said axes.

30. The device according to claim 29, further comprising:
a second action surface positioned on a second one of said cam bodies of said plurality of cam bodies, said second action surface being offset from a second one of said first axes of rotation about which said second one of said cam bodies rotates;
an over travel stop movably mounted on said housing, said over travel stop being movable into engagement with said second action surface for halting rotation said second one of said cam bodies about said second one of said first axes of rotation.

31. The device according to claim 30, wherein said over travel stop comprises:
a second lever mounted on said housing for pivoting motion about a pivot axis, a hook mounted on said second lever and positioned on one side of said pivot axis, said hook being engageable with said second action surface;
a spur mounted on said second lever on an opposite side of said pivot axis, said first lever being movable into engagement with said spur for pivoting said second lever to move said hook out of engagement with said second action surface upon movement of said first lever into engagement with said first action surface;
a return spring acting between said housing and said second lever for biasing said hook into engagement with said second action surface.

32. The device according to claim 1, further comprising a chuck for receiving said pipe element, said chuck being rotatable about a chuck axis, said chuck axis being arranged coaxially with said central axis.

33. The device according to claim 32, wherein said housing is pivotably and axially slidably mounted adjacent to said chuck.

34. The device according to claim 1, further comprising a motor engaged with a chuck for rotating said chuck about a chuck axis.

\* \* \* \* \*